United States Patent

Kremen et al.

[11] 3,891,853
[45] June 24, 1975

[54] ENERGY COMPENSATED SPECTROFLUOROMETER

[75] Inventors: Jerome C. Kremen, Takoma Park; Isaac Landa, Wheaton, both of Md.

[73] Assignee: Baxter Laboratories, Inc., Morton Grove, Ill.

[22] Filed: Mar. 20, 1974

[21] Appl. No.: 452,980

[52] U.S. Cl. .............................. 250/458; 250/461
[51] Int. Cl. ........................................... G01n 21/52
[58] Field of Search .......... 250/301, 304, 363, 372, 250/393, 458, 461; 356/96

[56] References Cited
UNITED STATES PATENTS

| | | | |
|---|---|---|---|
| 3,465,143 | 9/1969 | Doonan | 250/372 X |
| 3,497,690 | 2/1970 | Wheeless, Jr. et al. | 250/304 |
| 3,795,918 | 3/1974 | Sunderland | 356/96 X |
| 3,832,555 | 8/1974 | Ohnishi | 250/458 |

*Primary Examiner*—Archie R. Borchelt
*Attorney, Agent, or Firm*—Herman L. Gordon; Richard G. Kinney

[57] ABSTRACT

An energy-compensated spectrofluorometer of the time-shared double beam type employing a rotating chopper mirror disc providing a main measure channel as one of the time-shared outputs of a photomultiplier tube and a compensating reference channel generated by a reference light whose output is conveyed by a light pipe to the cathode of the photomultiplier tube, generating the other time-shared output thereof. The energy correction is derived from a thermal detector cell receiving part of the excitation beam, and the reciprocal of the thermal detector cell signal is subtracted from the dark current-corrected reference channel signal and is employed to adjust the high voltage supplied to the photomultiplier tube, thereby adjusting its gain. The measure channel includes means to compensate the measure signal for non-uniform spectral sensitivity of the photomultiplier tube, as well as for dark current. The reference channel signal is also modified to compensate for wavelength-dependent variations of quantum intensity in the excitation beam.

14 Claims, 4 Drawing Figures

ENERGY COMPENSATED SPECTROFLUOROMETER

This invention relates to spectrophotometers, and more particularly to an energy-compensated spectrofluorometer of the time-shared double beam type.

A main object of the invention is to provide a novel and improved spectrophotometer which may be employed in various different modes, including spectrofluorometer modes, spectral absorbance modes, differential spectral fluorometry modes, and others, and which is compensated for differences in energy from its excitation source at different wavelengths, and which is also compensated for differences in wavelength sensitivity of its photo-sensing means, the spectrophotometer being simple in construction, being stable in operation, and including means to compensate for the absorbance effect of the liquid contained in its sample holder.

A further object of the invention is to provide an improved energy-compensated spectrofluorometer of the time-shared double-beam type which may be employed in various modes, the spectrofluorometer having means to scan a sample with light of variable wavelength and having means to provide the effect of equal excitation energy at each wavelength, and also being provided with means to compensate the photomultiplier tube thereof for differences in wavelength sensitivity thereof, the apparatus being relatively compact in size, being easy to operate, and permitting rapid and accurate assays of the optical properties of materials.

A still further object of the invention is to provide an improved spectrofluorometer device of the time-shared double beam type which is provided with means for successively exciting a sample with all the spectral components of a polychromatic light source for determining the characteristic wavelength or wavelengths at which the sample has major fluorescent response and for quantitatively analyzing such major response for each of such excitation wavelengths, the double beam spectrofluorometer including highly effective means for generating a reference channel from the same photomultiplier tube employed to generate its measure channel, including means for automatically computing and applying corrections for different excitation energies at the different excitation wavelengths and being provided with means for applying a further correction factor to take care of variations in emission response sensitivity of the apparatus at different emission wavelengths, and being further provided with means for applying corrections to compensate for variations in quantum intensity with wavelength for the excitation beam spectrum, and for variations in the quantum emission of the sample as a function of emission wavelength, so that a complete and accurate quantitative assay of the fluorescent properties of a sample may be obtained, and so that the material may be accurately identified, the apparatus requiring the use of only a small sample of the material to be analyzed, being highly sensitive, being applicable for identifying and quantitatively analyzing a wide range of fluorescent materials, and permitting the continuous activation of a sample and the measurement of resulting fluorescence throughout a wide radiant energy spectrum.

Further objects and advantages of the invention will become apparent from the following description and claims, and from the accompanying drawings, wherein:

Figure 1:
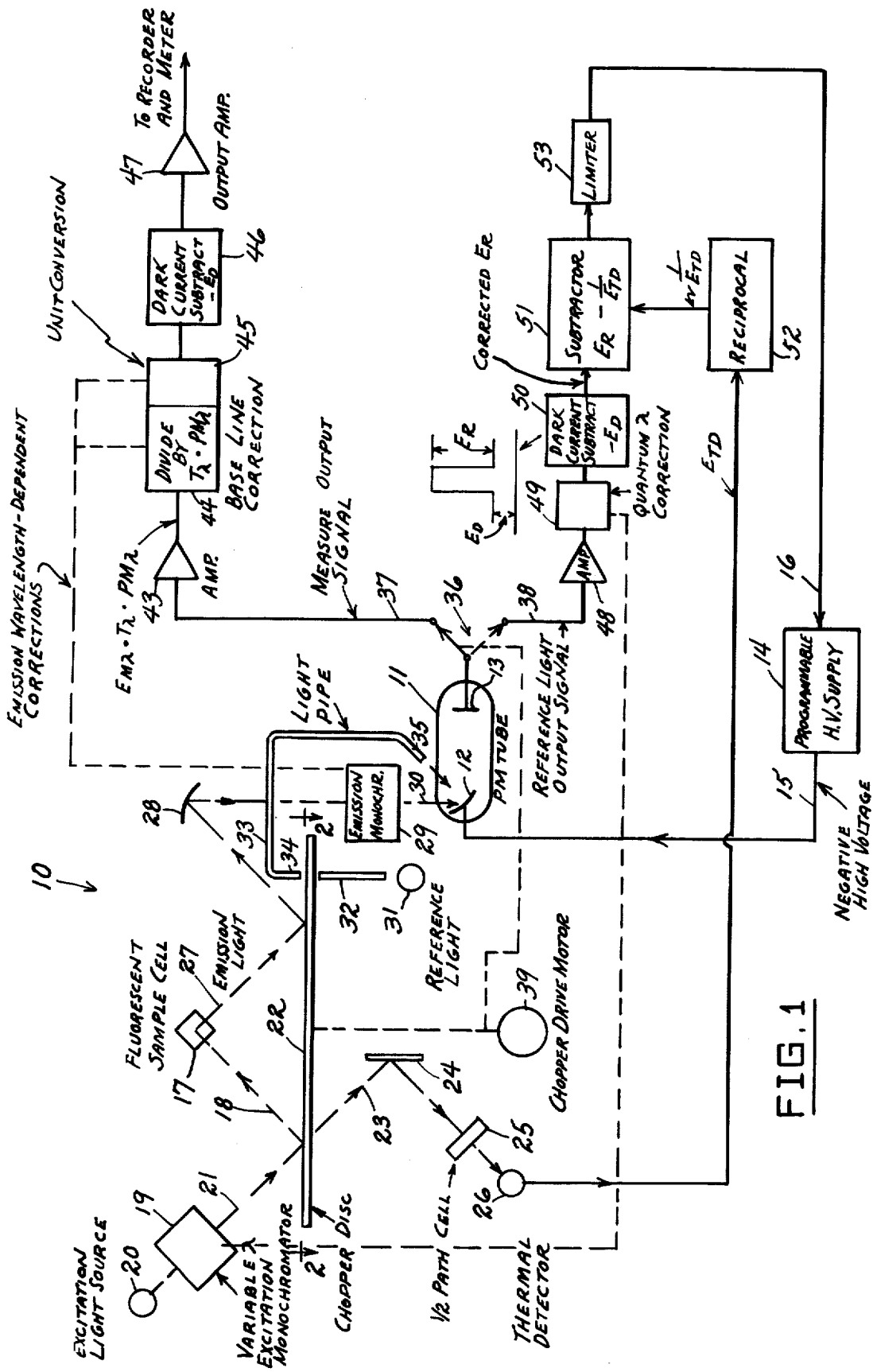
FIG. 1 is a schematic diagram of an improved time-sharing energy-compensated double beam spectrofluorometer constructed in accordance with the present invention.

Referring to the drawings, 10 generally designates a spectrofluorometer of the double beam type employing a photomultiplier tube 11 as its photosensitive element, said tube having a cathode 12, an anode 13 and other well known elements, not shown. The photomultiplier tube 11 is supplied with high voltage from an adjustable high voltage supply source 14 whose output 15 is shown as typically connected to cathode 12. The negative output voltage at 15 can be controlled in a conventional manner in accordance with an input control signal at 16. The gain of the photomultiplier tube 11 will be controlled in accordance with the voltage delivered to cathode 12.

The spectrofluorometer 10 includes a transparent sample cell 17 arranged to receive an excitation beam 18 from a first variable monochromator 19 which receives input radiation from a suitable wide-range source 20. The monochromator 19 emits a beam 21 of selected excitation wavelength (or various wavelengths in sequence when excitation scanning or excitation sequentially with multiple excitation wavelengths is desired), and a timed portion of beam 21 is reflected as beam 18 from a rotating chopper mirror disc 22, presently to be described, and is thus directed toward the sample cell 17. The disc 22 allows a second timed portion 23 of the excitation beam to reach a stationary plane mirror 24 positioned so as to reflect beam portion 23 through a compensating cell 25 to a thermal detector 26 which will generate a signal voltage $E_{TD}$ whose strength is in accordance with the energy level of the received beam. This device 26 may be a surface charge device wherein the charge difference across the device varies with temperature changes, similar to Model No. KT-2030, manufactured by Laser Precision Corp., Yorkville, N.Y. This device has a response to energy substantially independent of wavelength, i.e., provides a substantially flat spectral response.

In the typical spectrofluorometer arrangement illustrated in FIG. 1, a fluorescence emission beam 27 from the fluorescent sample in cell 17 is directed onto the rotating chopper mirror disc 22 and is reflected therefrom, in the same time segment as beam 18, to a stationary curved toroidal mirror 28, from which it is reflected into a second variable monochromator 29. A selected wavelength emission beam 30 from monochromator 29 is directed to the cathode 12 of the photomultiplier tube 11. The response signal from the photomultiplier tube will then be in accordance with the strength of the selected wavelength emission beam 30 ($E_{M\lambda}$) and with wavelength-dependent factors characteristic of the optical path and the photomultiplier tube, respectively, ($T_\lambda$ and $PM_\lambda$).

A reference channel synchronized with beam 23 is derived from a reference light source 31, which may comprise a source similar to Model No. MLED55 manufactured by Motorola Semiconductor Products, Inc., Phoenix, Ariz., which provides substantially red emission (about 660 nm). This type of reference source is preferred since the photomultiplier tube is not highly sensitive to red and therefore this avoids scatter light interference. The output of source 31 is directed through a first light pipe segment 32 through the chopper disc 22 to an end 34 of a second light pipe segment 33 aligned with the first segment 32. The second light pipe segment 33 leads to the photomultiplier tube 11 and has an inclined exit end portion 35 adjacent to and directed toward cathode 12. The reference light from source 31 thus provides an output signal from tube 11 synchronized with the thermal detector signal $E_{TD}$ previously mentioned.

Synchronized switching means, designated generally at 36, is employed to alternately switch the output of the photomultiplier tube to a measure channel, shown at 37, and to a reference channel, shown at 38. The switching means may be either electronic or mechanical, and is illustrated diagrammatically as being driven by the chopper drive motor 39 for simplicity. It will be understood that a wide range of equivalent coupling synchronizing means between the switch device 36 and the rotating chopper disc 22 may be employed.

Figure 2:
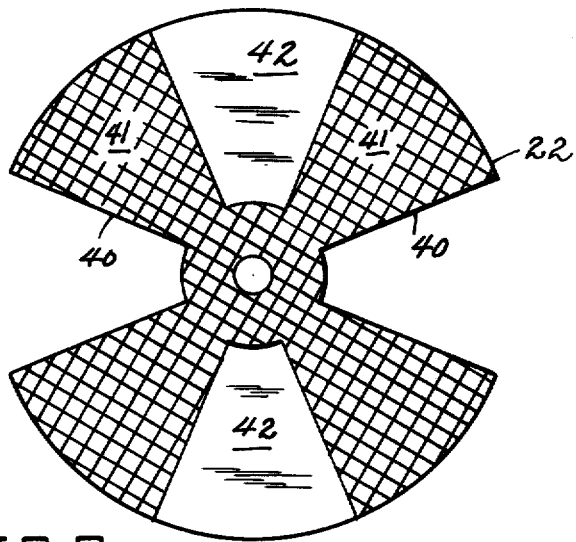
FIG. 2 is a horizontal plan view of the rotating chopper mirror disc employed in the spectrofluorometer of FIG. 1, said view being taken substantially on the line 2—2 of FIG. 1.

Referring to FIG. 2, it will be seen that the chopper disc 22 has diametrically opposed notches 40,40 which simultaneously provide exposure of thermal detector 26 to beam 21 and light pipe segment 33 to reference light 31. Between the notches 40,40 there are respective pairs of dark light-absorbing spaces 41,41 located on opposite sides of reflecting mirror spaces 42. Mirror spaces 42,42 simultaneously provide the reflected excitation beam 18 and the reflection of emission beam 27 toward the fixed curved directing mirror 28.

The compensating cell 25 (or "½ path" cell) located ahead of thermal detector 26 compensates for the attenuation of beam 18 in sample cell 17 caused by the sample liquid. The beam 18 is attenuated by an amount proportional to one-half the path length in cell 17. Thus, the thermal detector signal is attenuated to the same degree by using a transparent ½ path cell 25 containing liquid providing the same absorbancy as one-half the path length in cell 17. For example, for a sample cell 17 of 10 mm thickness, a transparent compensating cell 25 of 5 mm thickness containing the same liquid or material of the same absorbancy as the sample may be employed.

The measure output signal in channel 37 is processed through a current-to-voltage amplifier 43 and a base line correction amplifier 44, which is coupled to the wavelength control element of the emission monochromator 29 in a known manner and which is programmed to provide a wavelength correction term corresponding to $T_\lambda \cdot PM_\lambda$ and which divides the input signal entering device 44 by this term. A corresponding base line correction device is shown in U.S. Pat. No. 3,433,952 to H. K. Howerton. Thus, device 44 makes the necessary corrections to compensate for the above-mentioned emission wavelength-dependent factors. The device 44 may be accompanied by a "unit conversion" device 45 which introduces a gain change proportional to wavelength or wavelength cubed to convert the corrected signal to desired units, such as number of quanta per nanometer of bandwidth, number of quanta per $CM^{-1}$ (wave number) of bandwidth, or the like.

After the above-described processing, the resultant measure signal passes through a "dark current" correction device 46, which subtracts the residual photomultiplier dark current (the component $E_D$ of the measure signal produced by dark space 41) from the input measure signal, and the dark current-corrected signal then passes through an output amplifier 47 to the instrument display devices, such as a recorder and meter.

The reference light output signal in channel 38 is processed through a current-to-voltage amplifier 48 and a quantum intensity correction device 49 which is coupled to the wavelength control element of the excitation monochromator 19 and which is programmed to apply a correction term to compensate for wavelength-dependent quantum intensity variations in the excitation beam 21 by introducing a gain change proportional to the excitation wavelength.

The quantum-corrected signal is then corrected for dark current in a dark current subtractor 50 similar to subtractor 46 (dark current signal component $E_D$ is subtracted), and the resultant dark current-corrected reference light signal $E_R$ is furnished to one input of a subtractor 51.

The thermal detector signal $E_{TD}$ is processed through an inverter device 52 providing its reciprocal $1/E_{TD}$ at its output. Said reciprocal signal is furnished to the other input of the subtractor 51, and the resultant subtractor output comprising the energy-compensated remainder signal $E_R - (1/E_{TD})$ is delivered through a suitable limiter 53 to the high voltage supply control input 16.

The above-processed reference light signal is thus employed to vary the high voltage furnished by the supply unit 14 and thereby vary the gain of the photomultiplier tube 11 in a manner to compensate for (1) energy variations in the excitation beam 21, and (2) wavelength-dependent quantum intensity variations in the excitation beam.

Figure 3:
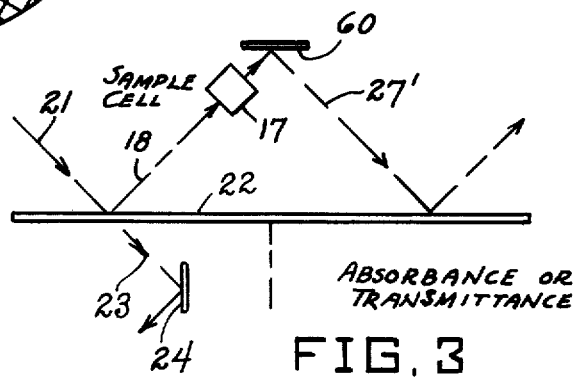
FIG. 3 is a diagram showing how the device of FIG. 1 may be modified for use as a spectrophotometer for making absorbance or transmittance measurements.

FIG. 3 diagrammatically illustrates how the spectrofluorometer of FIG. 1 may be modified for use as an instrument for making absorbance or transmittance measurements. In this arrangement, the "excitation" beam 18 travels through the sample cell 17 and is then reflected back to the chopper mirror disc from a stationary plane mirror 60 located parallel to rotating chopper disc 22, defining a reflected beam 27', taking a path substantially similar to that taken by the emission beam 27 in the previously described embodiment. The "emission" monochromator 29 either may be omitted or may be set at the wavelength of the excitation beam 21. In the arrangement shown in FIG. 3, spectral absorbance or transmittance measurements may be made through a sample in cell 17.

Figure 4:
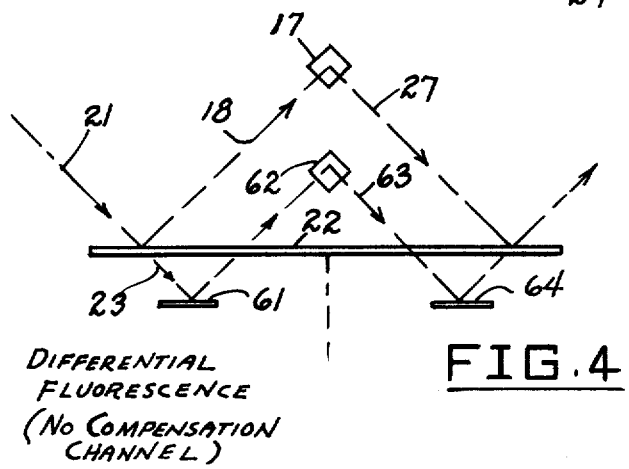
FIG. 4 is a diagram showing how the device of FIG. 1 may be modified for use as a differential spectrofluorometer.

FIG. 4 diagrammatically illustrates how the spectrofluorometer may be modified for use as a differential double beam spectrofluorometer. A first fluorescent sample in cell 17 is excited to fluorescence by a chopper-timed excitation beam reflected from the subjacent mirror element 42 of the chopper mirror disc 22 and an emission beam 27 is similarly reflected from the opposite mirror element 42 of the chopper mirror disc in the same manner as in FIG. 1, passing through the monochromator 29 and generating a response from the photomultiplier tube defining a first measure channel. A timed following portion of excitation beam 21 immediately thereafter travels through a notch 40 of the disc and is reflected from a first fixed plane mirror 61, arranged parallel to disc 22, back through the notch and is directed to a second transparent sample cell 62 containing a second fluorescent sample. Emission radiation is generated in cell 62 and leaves as an emission beam 63, the cell 62 being suitably oriented so that beam 63 can be directed through the opposite notch 40 of disc 22 to a fixed plane mirror 64 arranged parallel to disc 22 so as to reflect emission beam 63 back through said last-named notch 40 to travel along the same path as the reflected emission beam 27, namely, toward the fixed mirror 28, eventually to be directed through the monochromator 29 to the cathode 12 of the photomultiplier tube 11. The emission beams from the two samples are thus time-shared as they reach the photomultiplier tube and provide corresponding time-shared signals which can be compared or measured differentially. In the arrangement of FIG. 4, the reference light compensation channel, previously described in connection with FIG. 1, is not employed.

While certain specific embodiments of improved spectrophotometers have been described in the foregoing description, it will be understood that various modifications within the spirit of the invention may occur to those skilled in the art. Therefore it is intended that no limitations be placed on the invention except as defined by the scope of the appended claims.

What is claimed is:

1. In a spectrofluorometer, a source of radiant energy, a transparent sample holder, a photosensitive detector having variable gain, a moving chopper element, means including said moving chopper element defining an excitation optical channel directed to said holder and a second optical channel, means defining an emission optical channel between said sample holder and said photosensitive detector, a measure signal channel and a reference signal channel, switch means synchronized with the chopper element to alternately connect the output of the photosensitive detector to the measure signal channel and the reference signal channel, a reference radiant energy source, means including said moving chopper element defining an optical path between said reference source and said photosensitive detector time-shared with said emission optical channel, and means controlling the gain of said photosensitive detector in accordance with the signal generated in said photosensitive detector by said reference radiant energy source and the energy content of said second optical channel.

2. The spectrofluorometer of claim 1, and wherein said first-named source includes variable excitation wavelength-selection means, and means to apply a quantum intensity correction to the reference signal channel in accordance with the wavelength setting of said variable excitation wavelength-selection means.

3. The spectrofluorometer of claim 1, and wherein said emission optical channel includes variable emission wavelength-selection means, and means to apply an emission wavelength-dependent correction to said measure signal channel in accordance with the wavelength setting of said variable emission wavelength-selection means.

4. In a spectrofluorometer, a source of radiant energy, a transparent sample holder, a thermal electric detector means, means including a moving chopper element defining alternate time-spaced optical paths respectively between said source and said sample holder and between said source and said thermal electric detector means, whereby to generate an energy correction signal, a photosensitive detector, means defining a third optical path between said sample holder and said photosensitive detector, whereby to generate a measure signal at the output of said photosensitive detector, a reference radiant energy source, means including said chopper element defining a fourth optical path between said last-named source and said photosensitive detector which is time-spaced relative to said third optical path, whereby to generate a reference signal at the output of the photosensitive detector which is time-spaced relative to said measure signal, and means to control the response of said photosensitive detector in accordance with both said reference signal and said energy correction signal.

5. The spectrofluorometer of claim 4, and wherein the means to control the response of said photosensitive detector comprises computing means to derive the reciprocal of said energy signal and to compare said reference signal with said reciprocal.

6. The spectrofluorometer of claim 5, and wherein said photosensitive detector comprises a photomultiplier having an adjustable high voltage supply source, and wherein the means to control the response of the photosensitive detector comprises means to adjust said high voltage supply source in accordance with the difference between said reference signal and said reciprocal.

7. The spectrofluorometer of claim 6, and an output channel provided with indicator means, and a reference channel, and means synchronized with said moving chopper element to alternately connect the output of the photomultiplier to said output channel and said reference channel, said reference channel including said computing means and being operatively connected to said adjustable high voltage supply source.

8. The spectrofluorometer of claim 6, and wherein said means defining said third optical path includes said moving chopper element.

9. The spectrofluorometer of claim 8, and wherein said means defining the fourth optical path includes a light pipe having an inlet end receiving the output of said reference radiant energy source and having an outlet end adjacent to and operatively directed toward said photomultiplier.

10. The spectrofluorometer of claim 4, and wherein said first-named radiant energy source includes variable excitation wavelength-selection means, and means to apply a quantum intensity correction to said reference signal in accordance with the wavelength setting of said variable wavelength-selection means.

11. The spectrofluorometer of claim 4, and wherein said means defining the third optical path includes variable emission wavelength selection means, and means to apply an emission wavelength-dependent correction to said measure signal in accordance with the setting of said variable emission wavelength-selection means.

12. The spectrofluorometer of claim 4, and an output channel provided with indicating means, and a reference channel, said photosensitive detector comprising a photomultiplier having an adjustable high voltage supply means, switching means synchronized with said moving chopper element to alternately connect the output of said photomultiplier to said output channel and said reference channel, the means to control the response of said photosensitive detector comprising computing means to derive the reciprocal of said energy signal, and computing means in said reference channel to derive a comparison signal comprising the difference between said reference signal and said reciprocal, and circuit means to operatively connect said comparison signal to said adjustable high voltage supply means.

13. The spectrofluorometer of claim 12, and wherein said first-named radiant energy source includes variable excitation wavelength-selection means, means to apply a quantum intensity correction to said reference signal in said reference channel ahead of said second-named computing means, and wherein said means defining the third optical path includes variable emission wavelength-selection means, and means to apply an emission wavelength-dependent correction to said measure signal in said output channel in accordance with the setting of said variable emission wavelength-selection means.

14. The spectrofluorometer of claim 4, and a transparent absorbancy compensation cell in said optical path between said first-named source and said thermal electric detector means, said cell having substantially one-half the thickness of the sample holder and being adapted to contain material substantially of the same absorbancy as that inserted in the sample holder.

* * * * *